June 11, 1940.  M. GOSSMANN  2,203,867
PROTECTIVE DEVICE FOR ELECTRIC CIRCUITS
Filed March 23, 1938
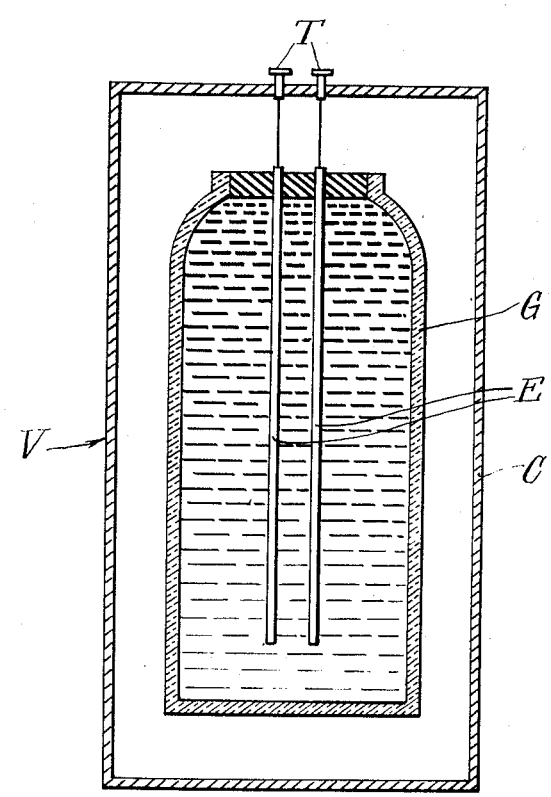
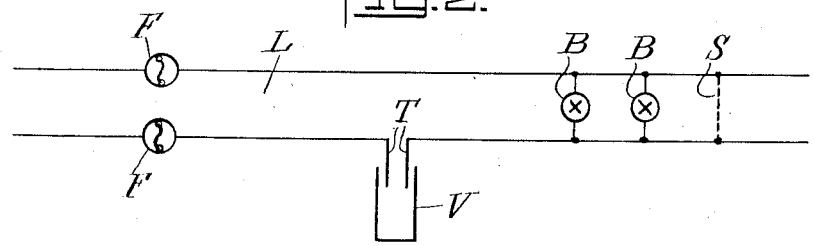
INVENTOR.
Mathias Gossmann
BY Kenyon & Kenyon
ATTORNEYS.

Patented June 11, 1940

2,203,867

UNITED STATES PATENT OFFICE 2,203,867

PROTECTIVE DEVICE FOR ELECTRIC CIRCUITS

Mathias Gossmann, Mexico, D. F., Mexico, assignor to Luis G. Legorreta, Mexico, D. F., Mexico Application March 23, 1938, Serial No. 197,586
In Mexico January 12, 1938

8 Claims. (Cl. 175—319)

This invention relates to protective devices for electric circuits and has for an object an electrolytic valve for connection in series in an electrical circuit to prevent injurious effects from the establishment of a short circuit in said circuit.

A device embodying the invention permits flowing of current in the circuit to supply the requirements of the electrical apparatus included in the circuit, but, in the event of a short circuit, its interior impedance or resistance increases sufficiently to prevent excessive current flow so long as the short circuit condition exists and re-establishes normal current flow as soon as the short circuit condition is rectified.

The device consists of a container in which two non-film forming electrodes such, for example, as chromium electrodes, are submerged in an electrolyte solution consisting of sodium chloride, calcined magnesia, thickening agent and water. When this device is connected in series in an electrical circuit, that portion of the circuit beyond the valve is protected. In any such portion of the circuit the establishment of a short circuit will result in an increase in the resistance of the valve sufficient in magnitude to prevent the blowing out of fuses and the overheating of the conductors.

Other objects, novel features and advantages of this invention will become apparent from the following specification and accompanying drawing, wherein the two figures illustrate a circuit equipped with a valve embodying the invention, and the valve structure.

Fig. 1 is a section through the valve, and

Fig. 2 is a circuit diagram.

In the drawing, L represents a house lighting circuit or the like equipped with the usual fuses F and having lamps B or other electrical apparatus connected in the circuit. The valve V which embodies the invention comprises a casing C of wood or other suitable material in which is arranged a container G of glass or other suitable material closed by a cap. Supported by the cap are a pair of chromium electrodes E which are immersed in an electrolyte comprising a solution consisting of the following ingredients in the weight percentage indicated:

|  | Per cent |
| --- | --- |
| Sodium chloride | 15 |
| Glucose | 25 |
| Calcined magnesia | 35 |
| Distilled water | 25 | the glucose being provided to render the electrolyte semi-solid. Terminals T provided in the casing C are connected to the electrodes E.

The valve V is connected in one side of the circuit L between the fuse F and the first lamp B and so long as normal conditions prevail in the circuit L, the valve V will transmit current for energization of the lamps B or other similar apparatus. However, should a short circuit be established at S as indicated in dotted lines, the interior impedance or resistance of the valve V immediately increases sufficiently to prevent overheating of the circuit conductors and also prevent the blowing out of the fuses F. So soon as the short circuit condition is rectified, the valve V again becomes effective to pass the current required for normal circuit operations.

The valve of this invention may be used for numerous purposes. For example, it may be used in the ignition circuit of an automobile and in the event of a short circuit of the fuses will not burn out nor will the battery discharge and when the short circuit is removed, the circuit will regain its normal condition. Also, it may be used in connection with a motor so that should the motor become overloaded it will disconnect the motor until the overload condition is relieved. Furthermore, it may be used in radio sets to protect the transformer against burning out and prevent the possibility of a fire. The valve may be made of different sizes according to the use to which it is to be put.

In ordinary voltage conditions such as exist when there is no short circuit, the cell passes the current necessary to energize the devices in circuit with it and a certain amount of electrolysis takes place in the cell, the gas produced by such electrolysis being insufficient appreciably to affect the current flow. When the quantity of energy supplied to the cell suddenly increases as the result of a short circuit, the gas produced by electrolysis increases rapidly and forms high resistance layers around the electrodes, which prevent the excessive passage of current until the short circuit condition is remedied.

I claim:

1. An electrolytic valve characterized by increase of resistance with increase of applied voltage, said valve comprising a container and a pair of chromium electrodes supported within said container, said container containing an electrolyte solution consisting of the following ingredients in the weight percentage indicated: sodium chloride 15%; glucose 25%; calcined magnesia 35% and water 25%.

2. An electrolytic valve characterized by increase of resistance with increase of applied voltage, said valve comprising a container containing an electrolyte solution consisting of sodium chloride, glucose, calcined magnesia and water, and a pair of chromium electrodes supported within said container, said electrodes being submerged in said electrolyte solution.

3. A device of the character described comprising a container, a pair of non-film-forming electrodes in said container and an electrolyte solution in said container consisting of the following ingredients in the weight percentage indicated: sodium chloride 15%; glucose 25%; calcined magnesia 35% and distilled water 25%.

4. A device of the character described comprising a container, a pair of chromium electrodes supported within said container, and an electrolyte solution in said container surrounding said electrodes, said electrolyte solution consisting of the following ingredients in the weight percentages indicated, sodium chloride 15%, thickening agent 25%, calcined magnesia 35% and water 25%.

5. A device of the character described comprising a container, a pair of chromium electrodes supported within said container and an electrolyte solution in said container surrounding said electrodes, said electrolyte solution consisting of sodium chloride, thickening agent, calcined magnesia and water.

6. A device of the character described comprising a container, a pair of non-film-forming electrodes in said container and an electrolyte solution in said container surrounding said electrodes, said electrolyte solution consisting of the following ingredients in the weight percentage indicated, sodium chloride 15%, thickening agent 25%, calcined magnesia 35% and water 25%.

7. A device of the character described comprising a container, a pair of non-film-forming electrodes in said container, and an electrolyte solution in said container surrounding said electrodes, said electrolyte solution consisting of sodium chloride, thickening agent, calcined magnesia and water.

8. A device of the character described comprising a container, a pair of non-film-forming electrodes in said container, and an electrolyte solution in said container surrounding said electrodes, said electrolyte solution consisting of sodium chloride, glucose, calcined magnesia and water.

MATHIAS GOSSMANN.